(12) United States Patent
Underwood

(10) Patent No.: US 12,489,955 B2
(45) Date of Patent: Dec. 2, 2025

(54) ONLINE DEBATE PLATFORM AND METHOD

(71) Applicant: VURBIL, INC., Denver, CO (US)

(72) Inventor: Erik Monroe Underwood, Denver, CO (US)

(73) Assignee: VURBIL, INC., Denver, CO (US)

(*) Notice: Subject to any disclaimer, the term of this patent is extended or adjusted under 35 U.S.C. 154(b) by 0 days.

(21) Appl. No.: 17/330,142

(22) Filed: May 25, 2021

(65) Prior Publication Data
US 2021/0345002 A1 Nov. 4, 2021

(51) Int. Cl.
| | |
|---|---|
| H04N 21/4788 | (2011.01) |
| G10L 25/51 | (2013.01) |
| H04N 7/14 | (2006.01) |
| H04N 7/15 | (2006.01) |
| H04N 21/2187 | (2011.01) |
| H04N 21/472 | (2011.01) |

(52) U.S. Cl.
CPC ......... *H04N 21/4788* (2013.01); *G10L 25/51* (2013.01); *H04N 7/147* (2013.01); *H04N 21/2187* (2013.01); *H04N 21/47202* (2013.01); *H04N 7/155* (2013.01)

(58) Field of Classification Search
CPC ............ H04N 21/4788; H04N 21/147; H04N 21/2187; H04N 21/47202; H04N 7/155; G10L 25/51
See application file for complete search history.

(56) References Cited

U.S. PATENT DOCUMENTS

| | | | | |
|---|---|---|---|---|
| 10,129,288 | B1* | 11/2018 | Xie | ............... H04L 63/1425 |
| 2008/0263585 | A1* | 10/2008 | Gell | ................ H04N 21/4788 |
| | | | | 725/32 |
| 2015/0350733 | A1* | 12/2015 | Persidis | ............ H04N 21/4781 |
| | | | | 725/24 |
| 2016/0110433 | A1* | 4/2016 | Sawhney | ............ G06F 16/9535 |
| | | | | 707/722 |
| 2019/0266242 | A1* | 8/2019 | Arumugam | ............. G06F 40/30 |
| 2019/0306208 | A1* | 10/2019 | Robinson | ............. G06F 40/279 |
| 2021/0258536 | A1* | 8/2021 | Mickeal | ................ G06Q 50/01 |

(Continued)

FOREIGN PATENT DOCUMENTS

WO    WO-2010044764 A1 *  4/2010  ......... H04L 12/1822

*Primary Examiner* — Ricky Chin
(74) *Attorney, Agent, or Firm* — Kutak Rock LLP; Ryan S. Hinderliter

(57) ABSTRACT

The present invention comprises a novel social media video debating web and mobile application. The platform will provide a space for users to debate uninterrupted by both the audience and the opponent whereby each participant is given a set time to express their thoughts on a subject matter. The online debate platform provides a controlled setting for the participants to have their debates viewed, voted on and subsequently ranked by the other users of the platform. The online debate platform is also monitored by a unique AI system that updates debate "winners," flags offensive content, and moderates each debate on the platform in real time. The disclosed platform and following figures will provide a space for individuals to debate subjects in a uniformed structure and have real-time results from active user viewership. The online debate platform aims to provide an established place for constructive debating.

1 Claim, 20 Drawing Sheets

(56) References Cited

U.S. PATENT DOCUMENTS

| | | | | |
|---|---|---|---|---|
| 2021/0345002 | A1* | 11/2021 | Underwood | H04N 21/2187 |
| 2021/0370188 | A1* | 12/2021 | Thomas | A63F 13/355 |
| 2021/0392052 | A1* | 12/2021 | Soryal | H04L 41/069 |
| 2022/0067844 | A1* | 3/2022 | Bordier | G07C 13/00 |
| 2022/0329556 | A1* | 10/2022 | Daga | H04L 51/23 |
| 2023/0017111 | A1* | 1/2023 | Chhabra | H04S 7/303 |
| 2024/0403983 | A1* | 12/2024 | Underwood | H04N 7/155 |

\* cited by examiner

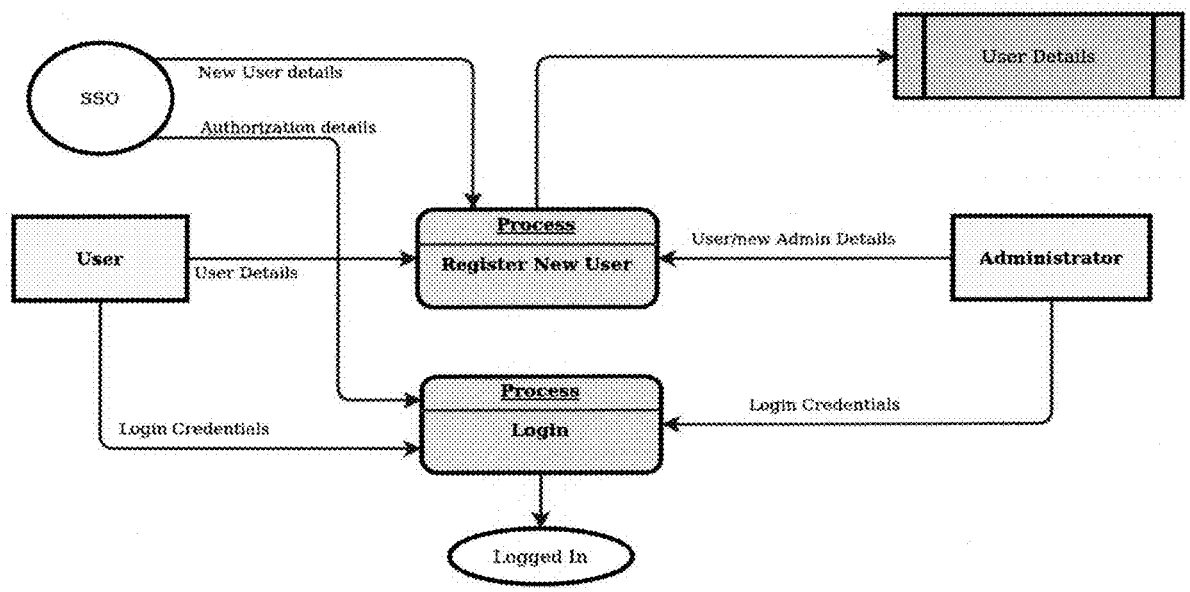
Fig. 1 – Account dashboard/newsfeed and profile diagram

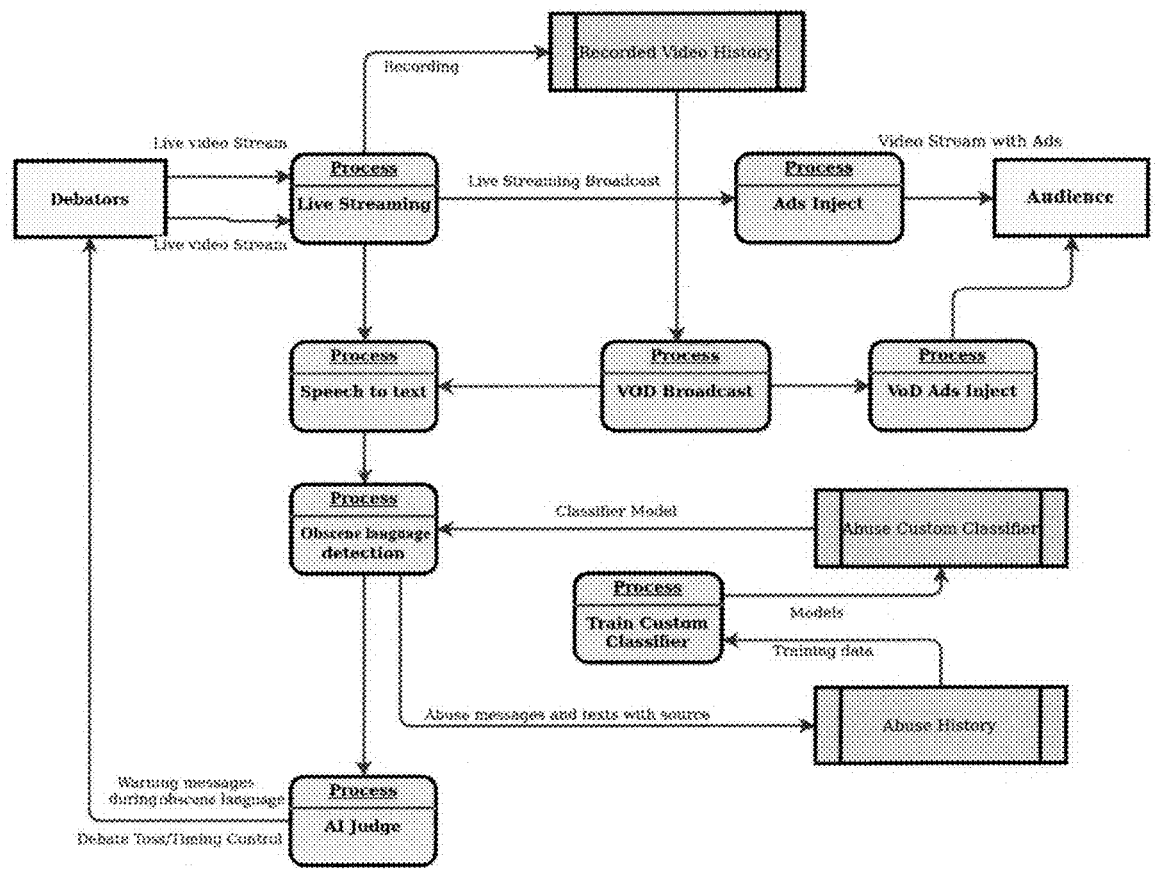
Fig. 2 – Live streaming, VoD broadcast diagram
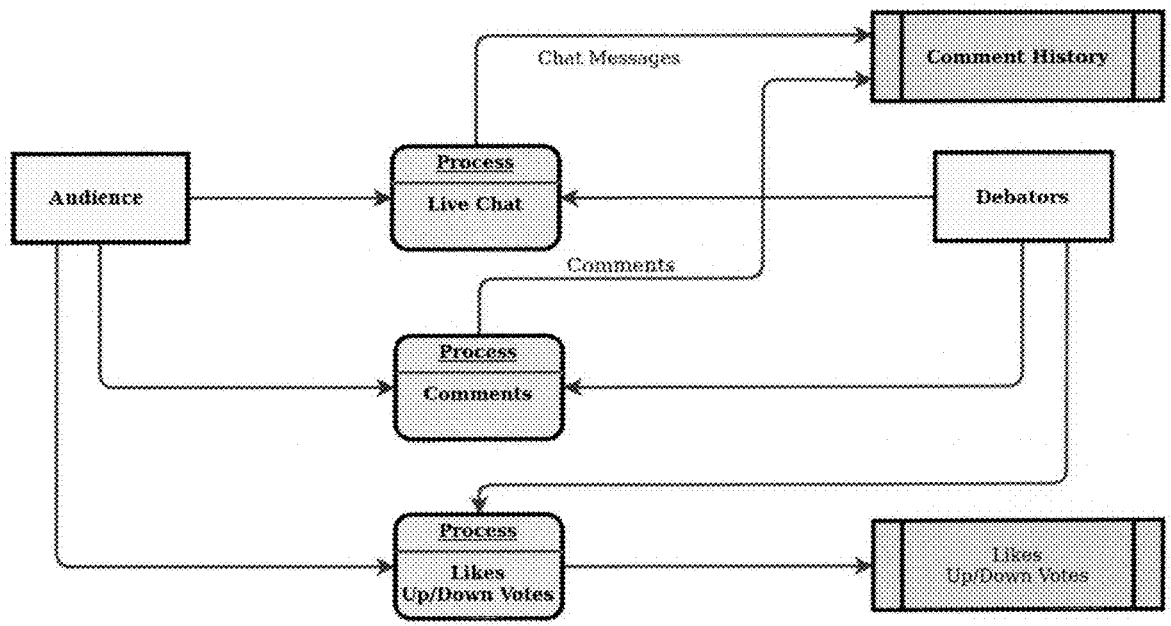
Fig. 3 – Comments, likes, and votes diagram

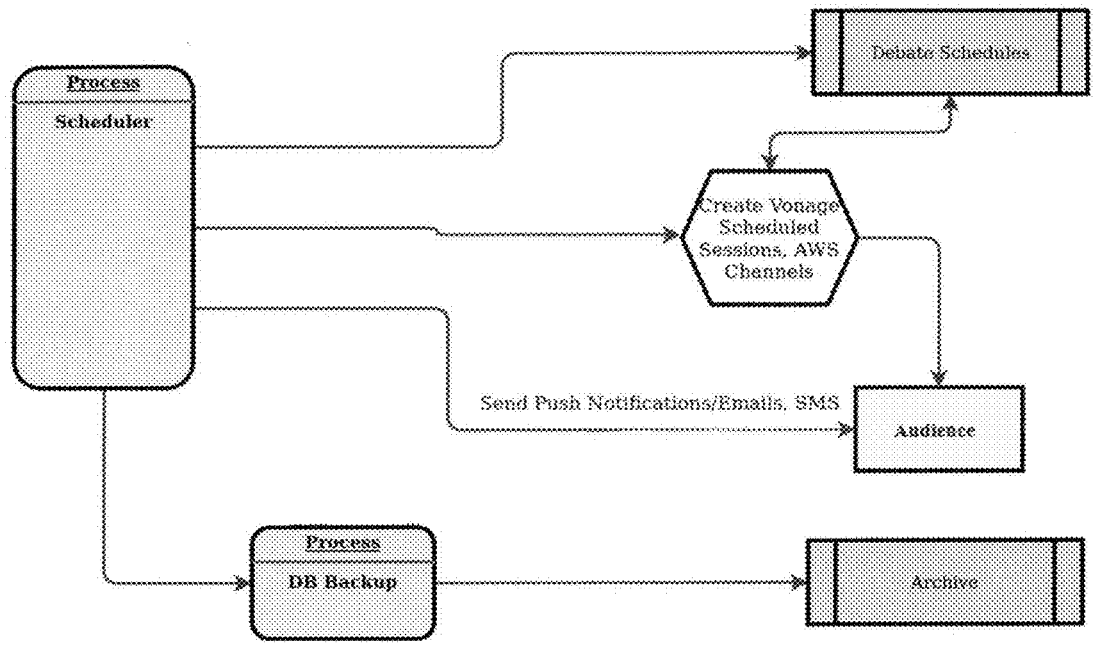
Fig. 4 — Debate scheduler diagram
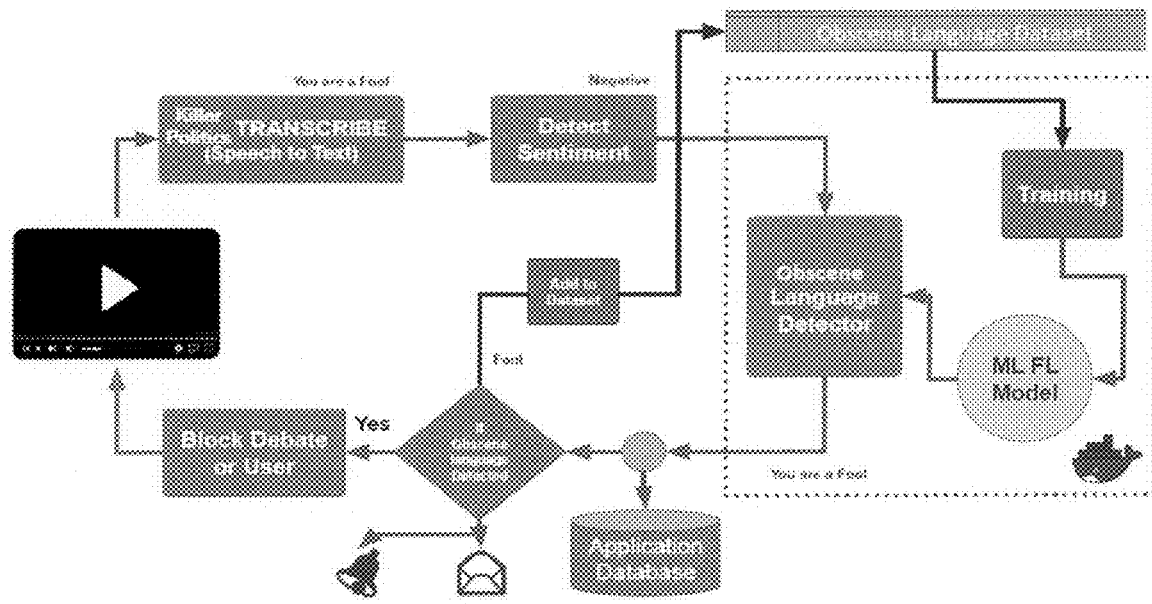
Fig. 5 — AI system obscene language monitoring diagram

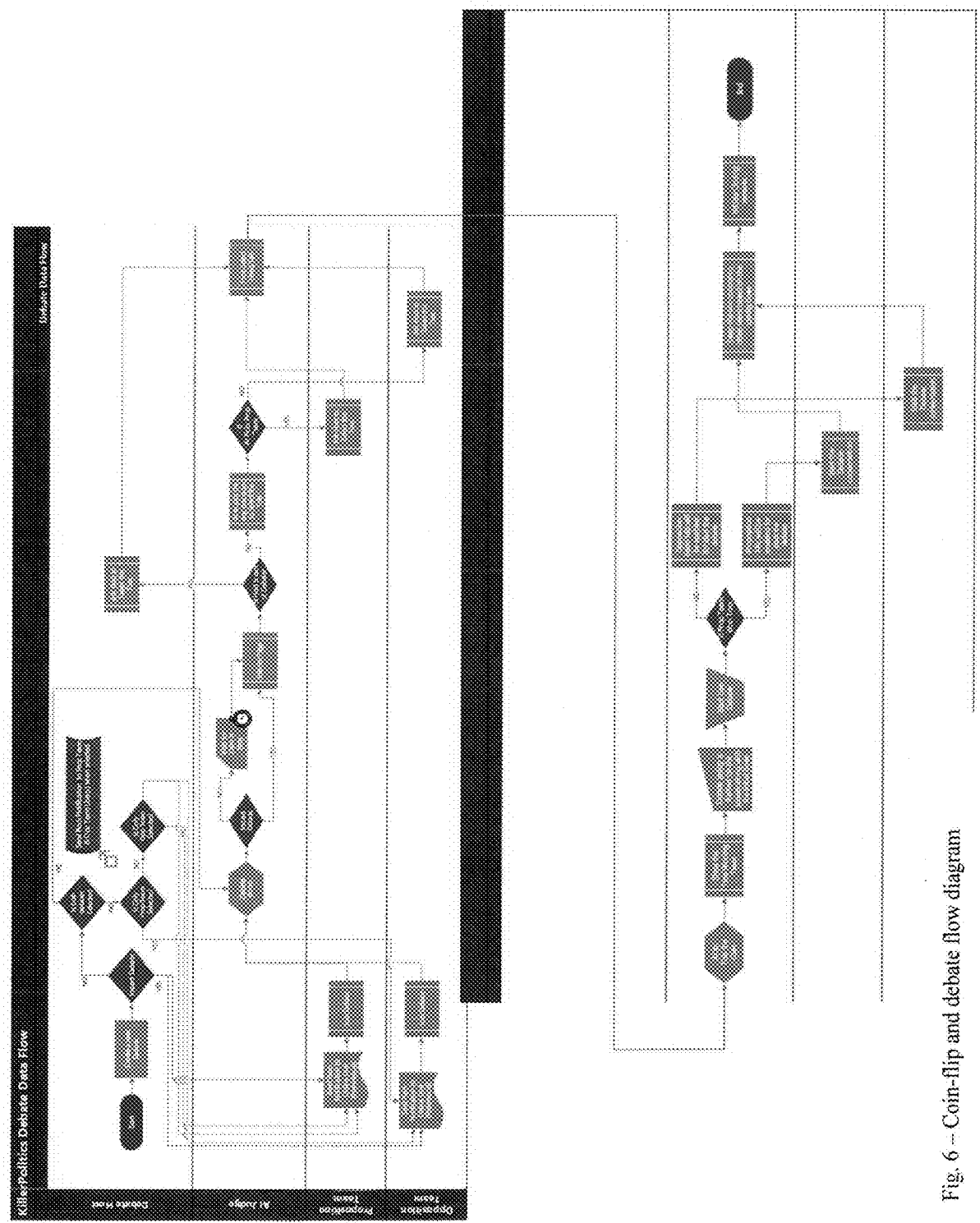
Fig. 6 -- Coin-flip and debate flow diagram

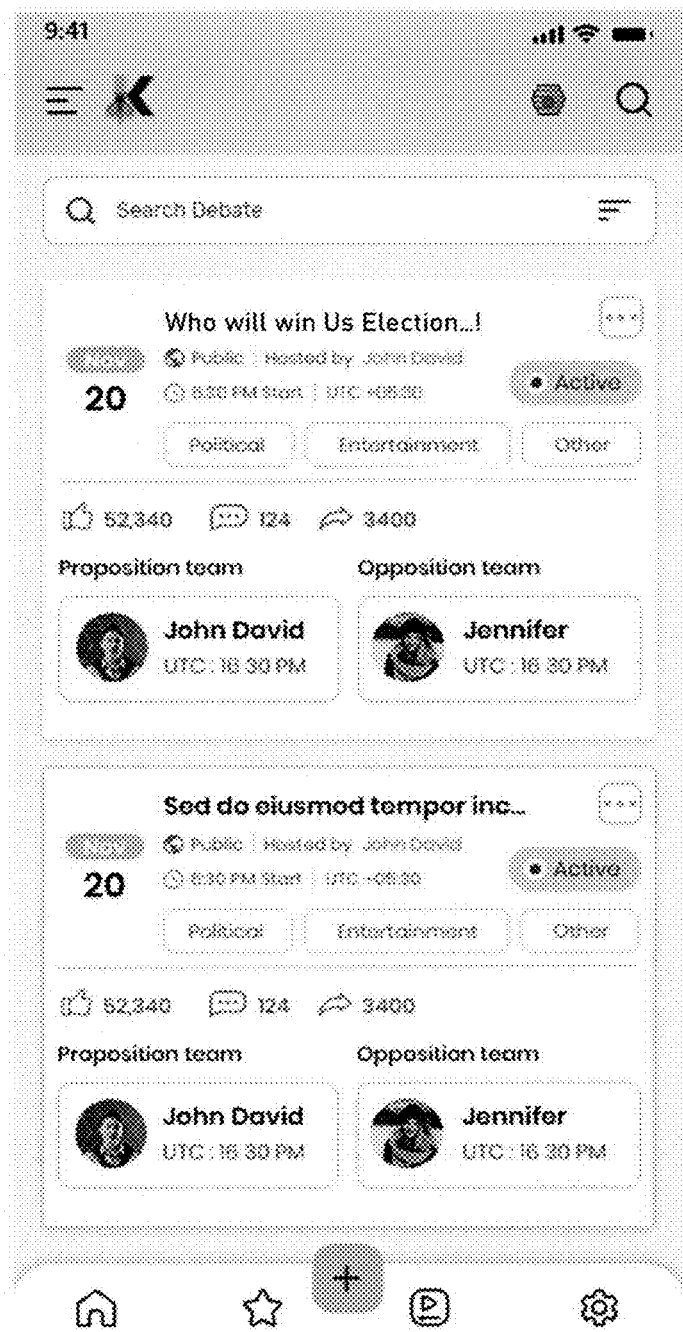
Fig. 7 – Platform dashboard: mobile

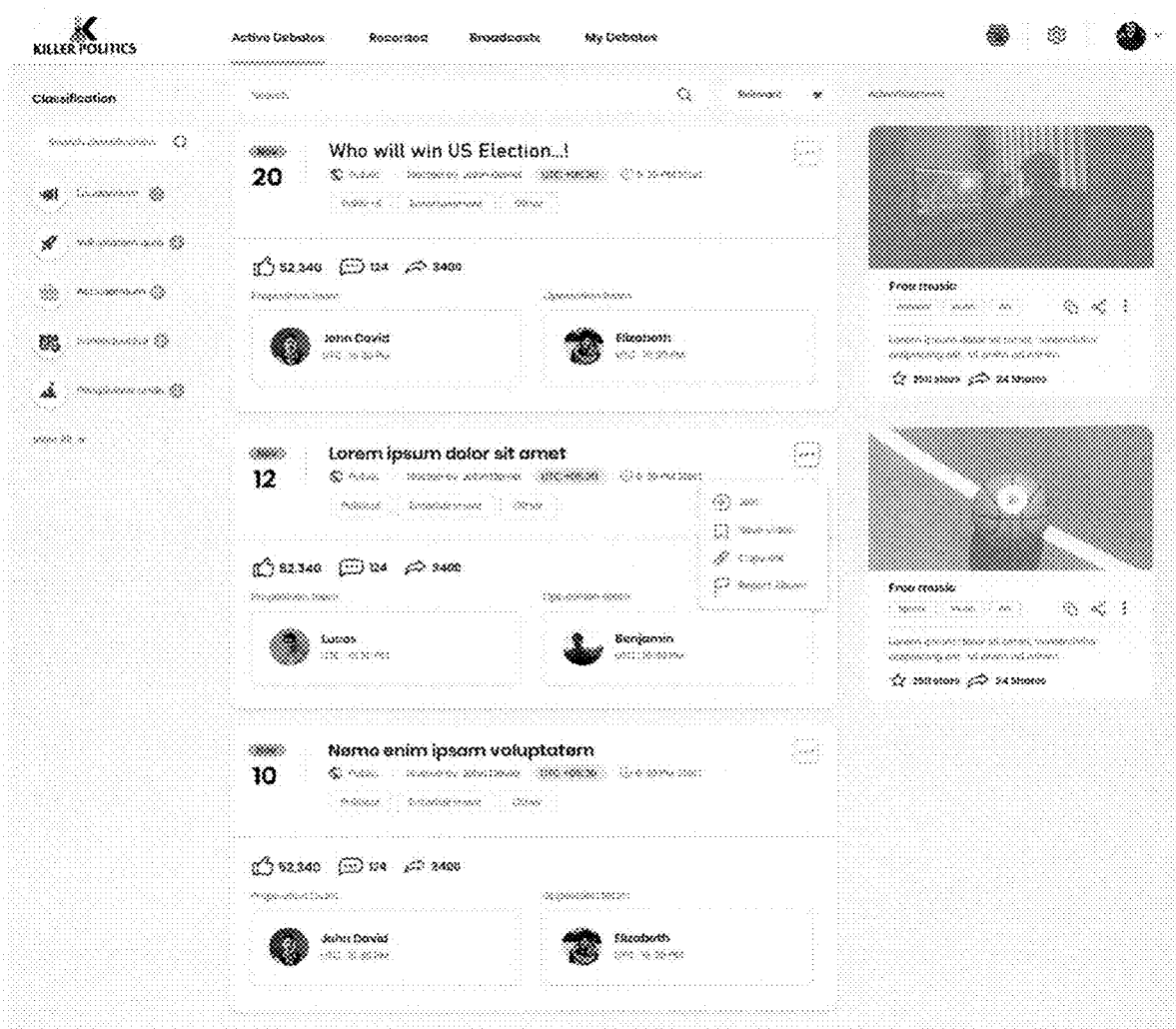
Fig. 8 – Platform dashboard: website

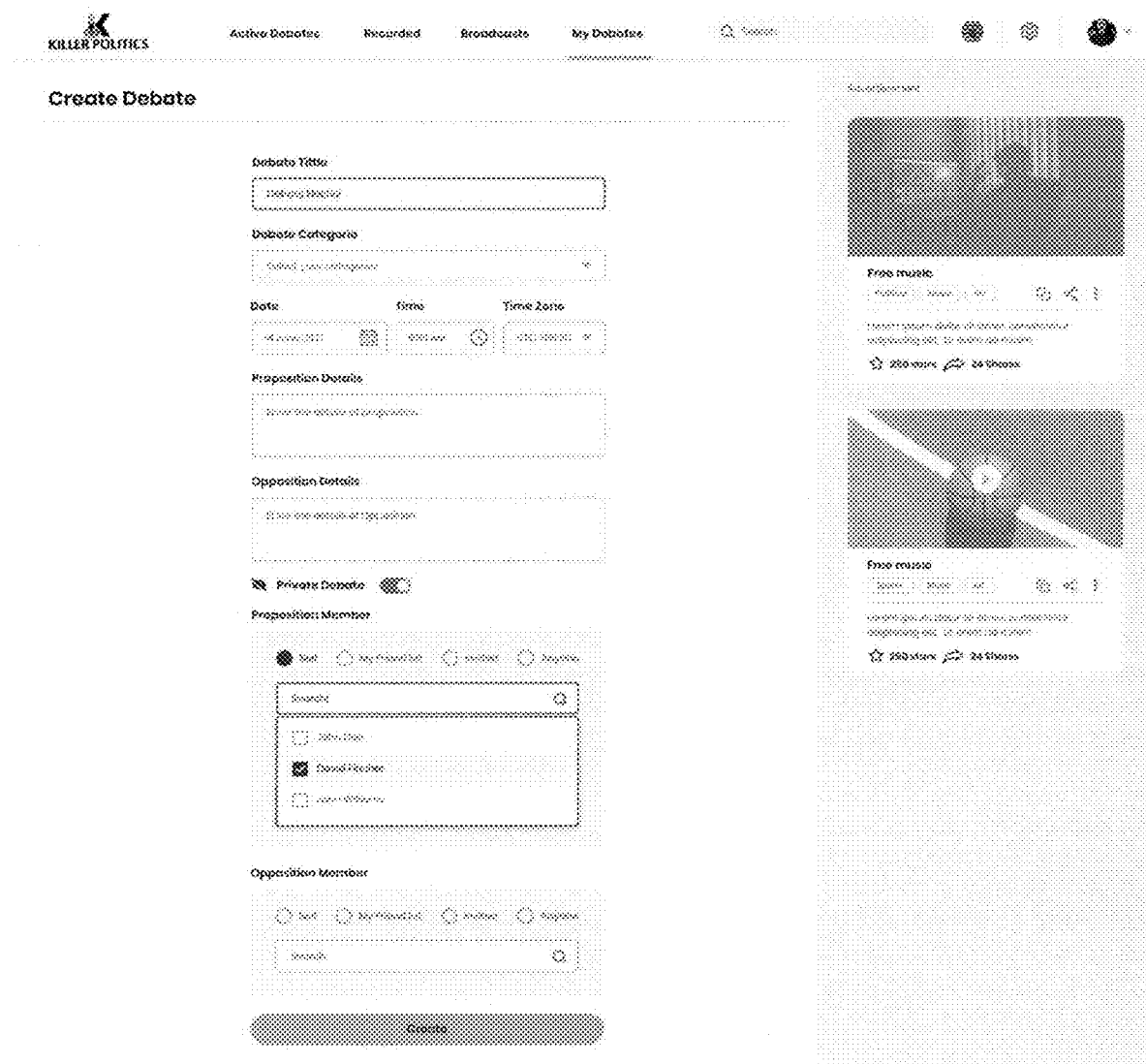
Fig. 9 -- Debate creation example: website

Fig. 10 – Debate creation example: mobile

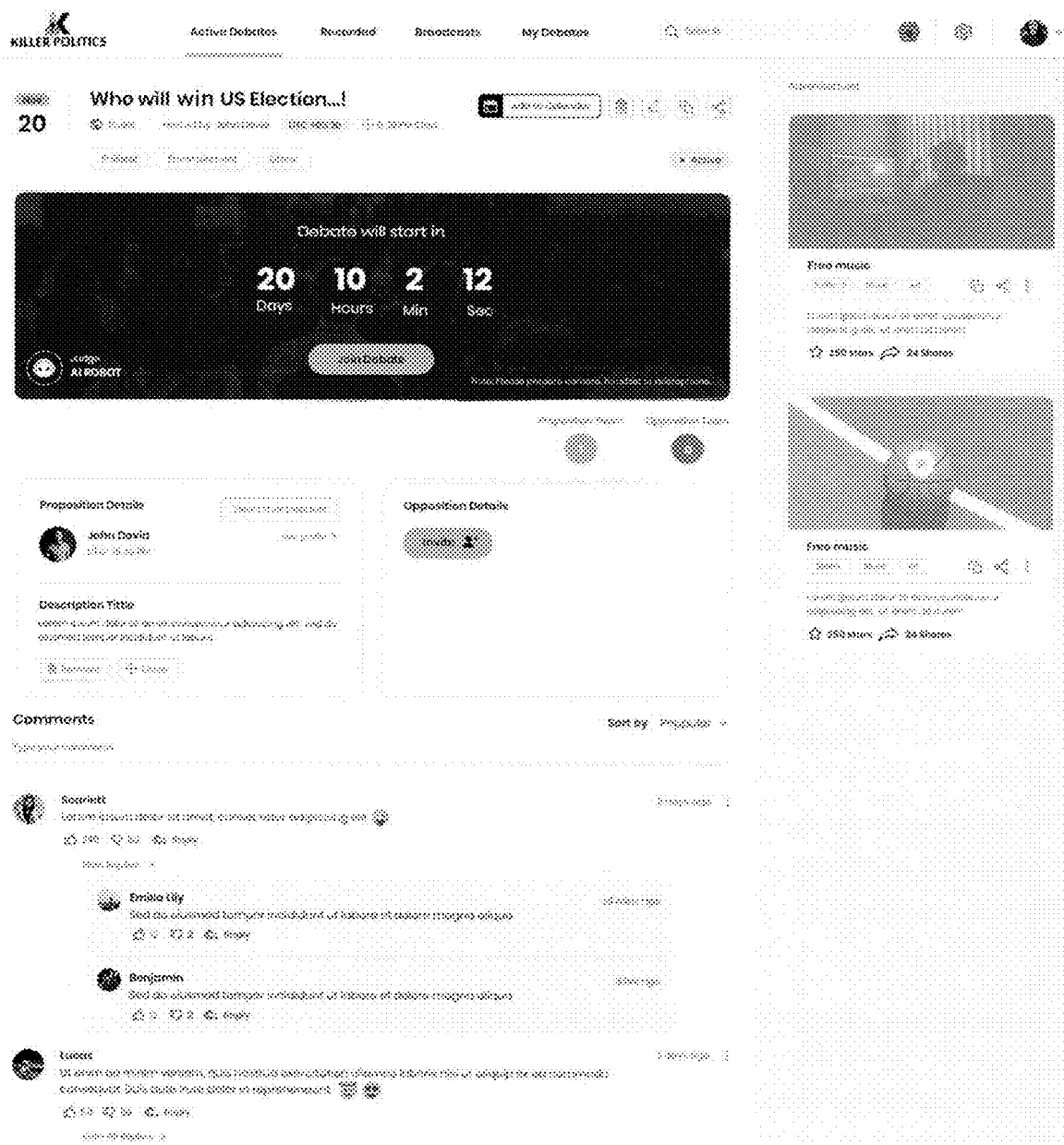
Fig. 11 – Scheduled debate example: website

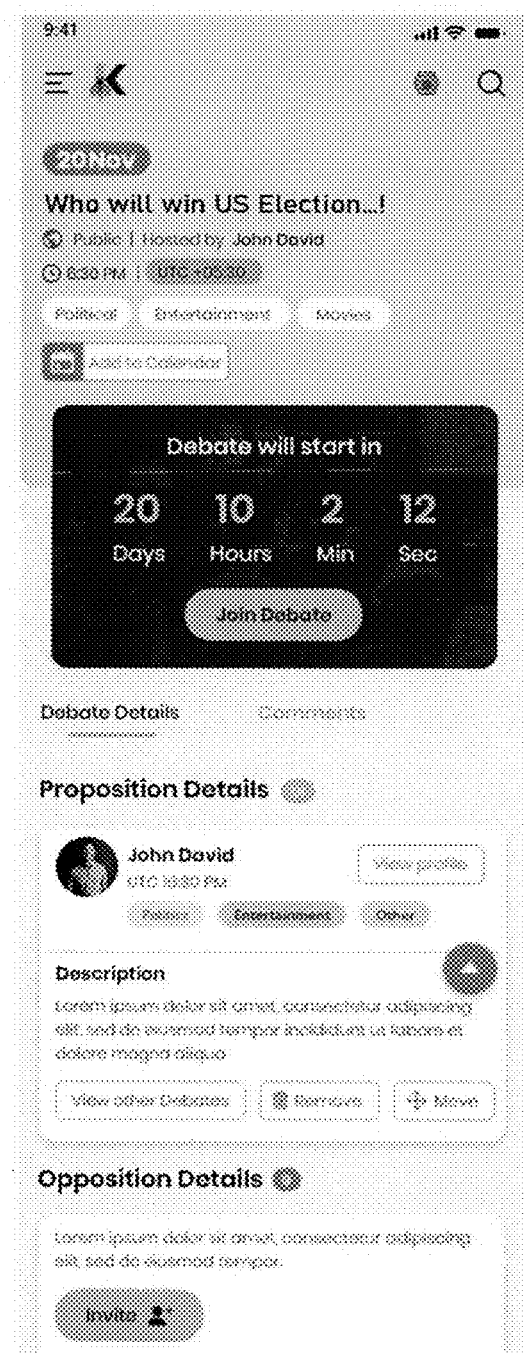
Fig. 12 – Scheduled debate example: mobile

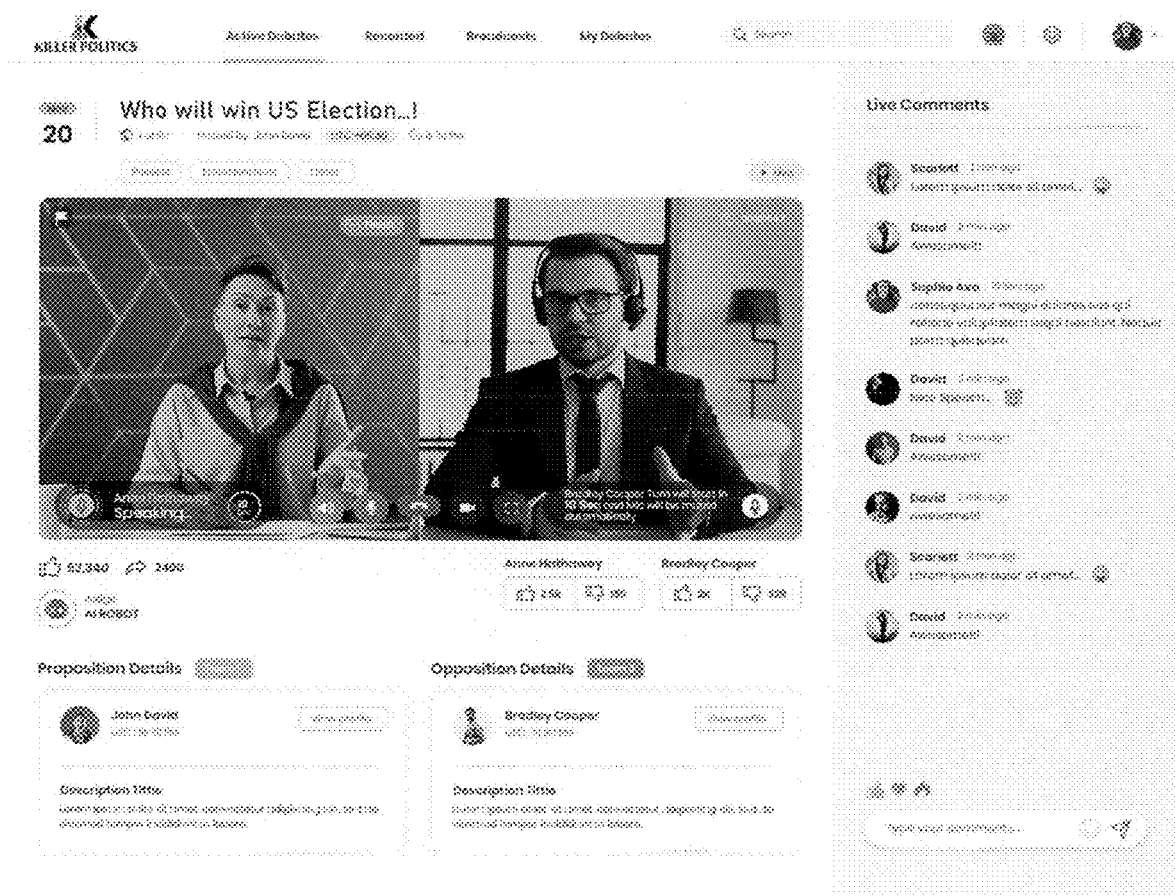
Fig. 13 – Example of active debate/descriptions/comments/voting: website

Fig. 14 – Example of active debate/descriptions/comments/voting: mobile

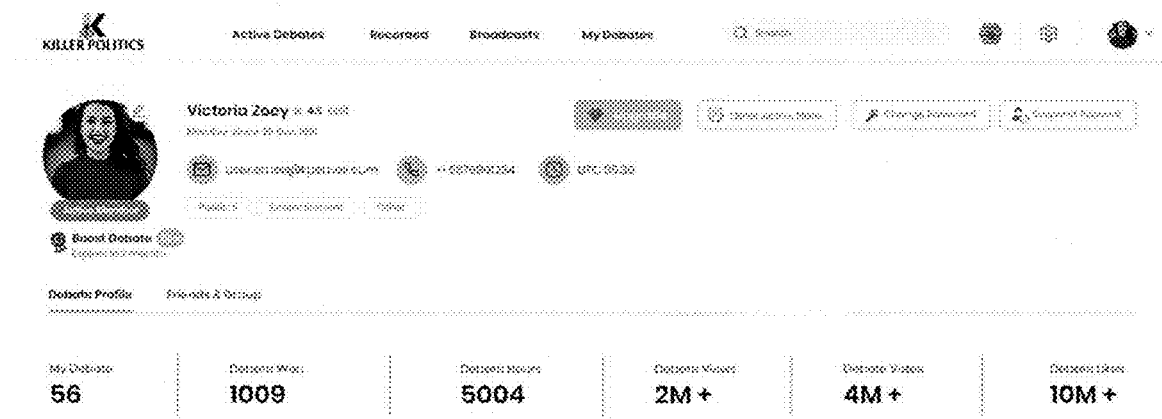
Fig. 15 – Public profile view example
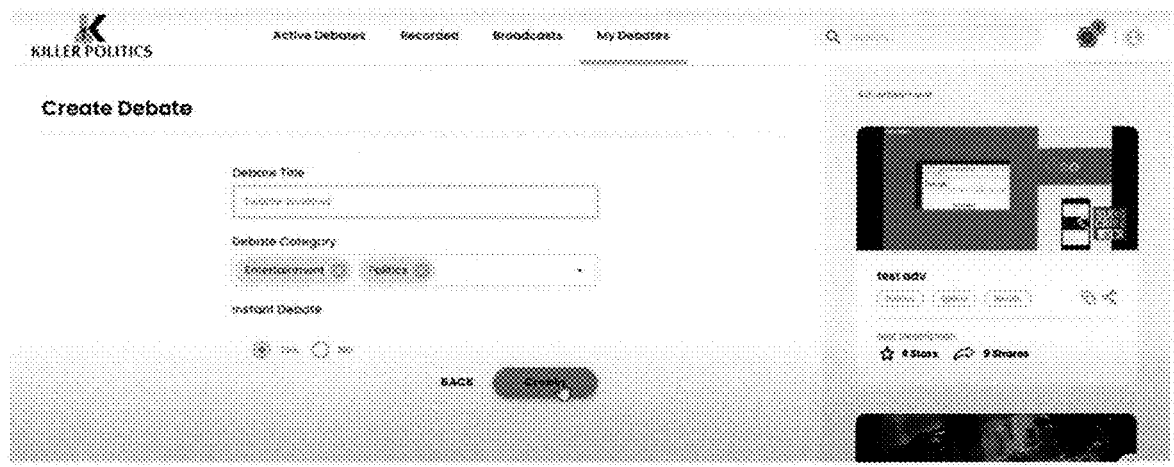
Fig. 16 – Instant debate creation (by user) example: website

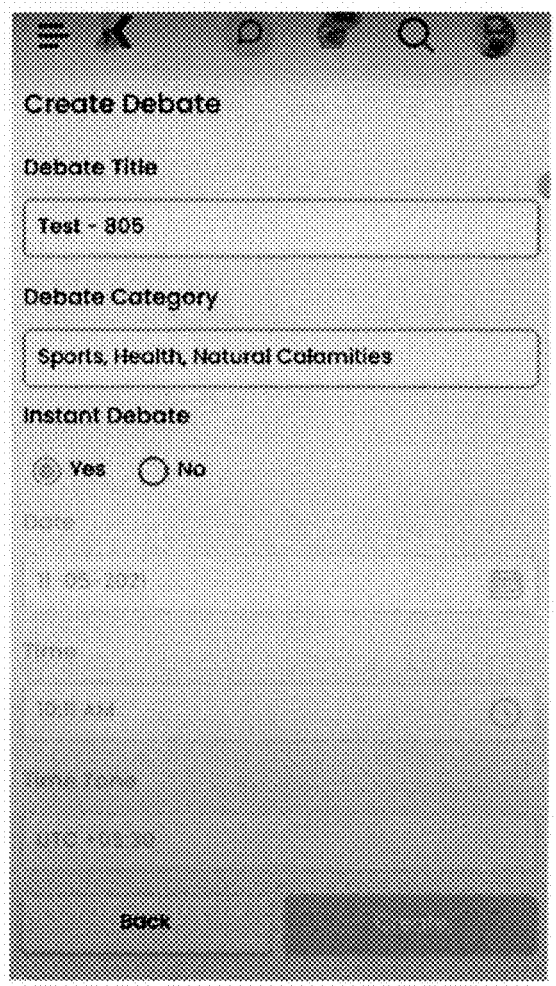
Fig. 17 - Instant debate creation (by user) example: mobile

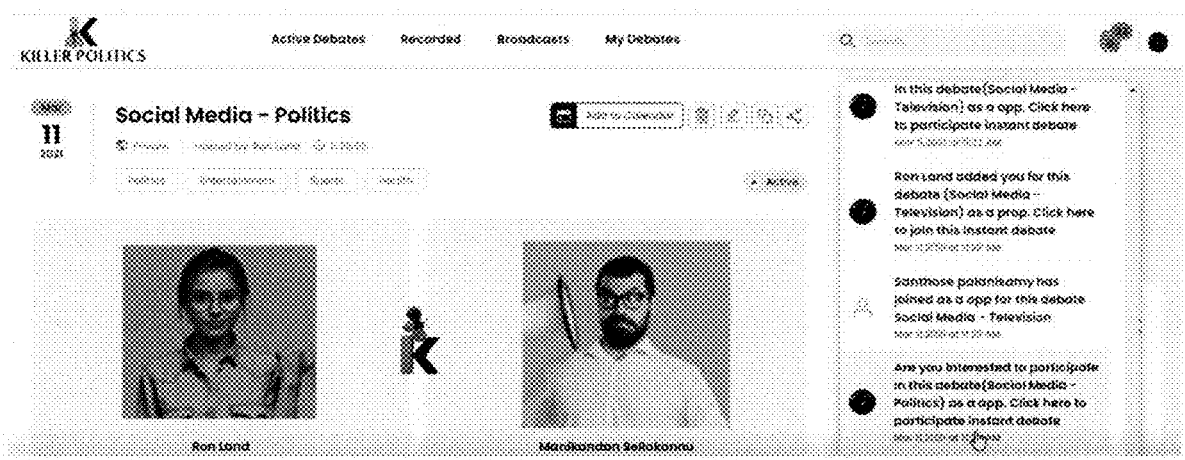
Fig. 18 – Instant debate notification & appearance example: website
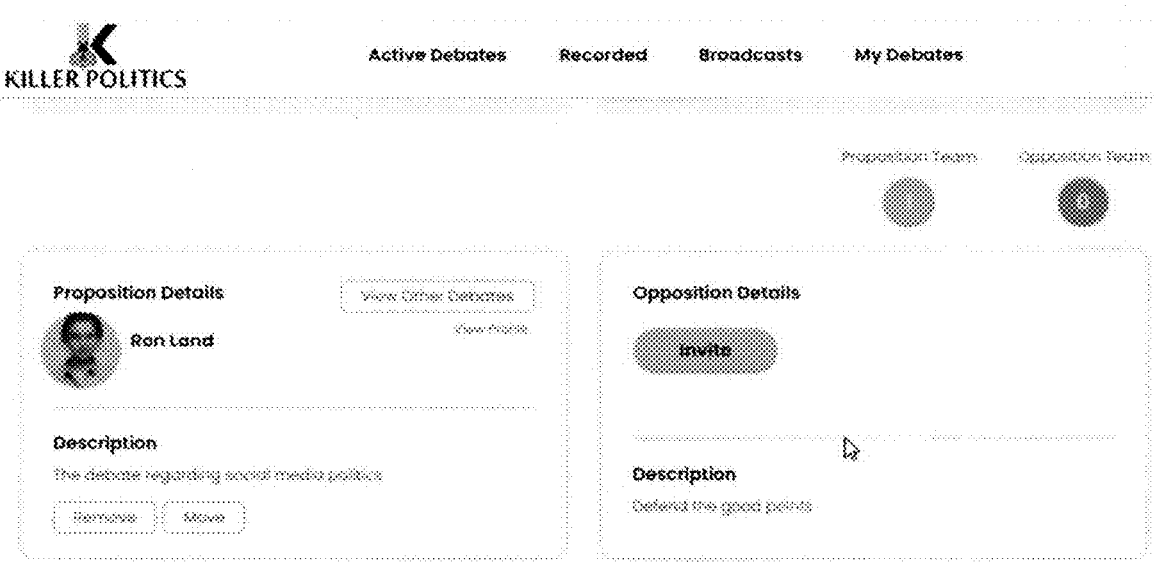
Fig. 19 – Instant debate join/invite option example: website

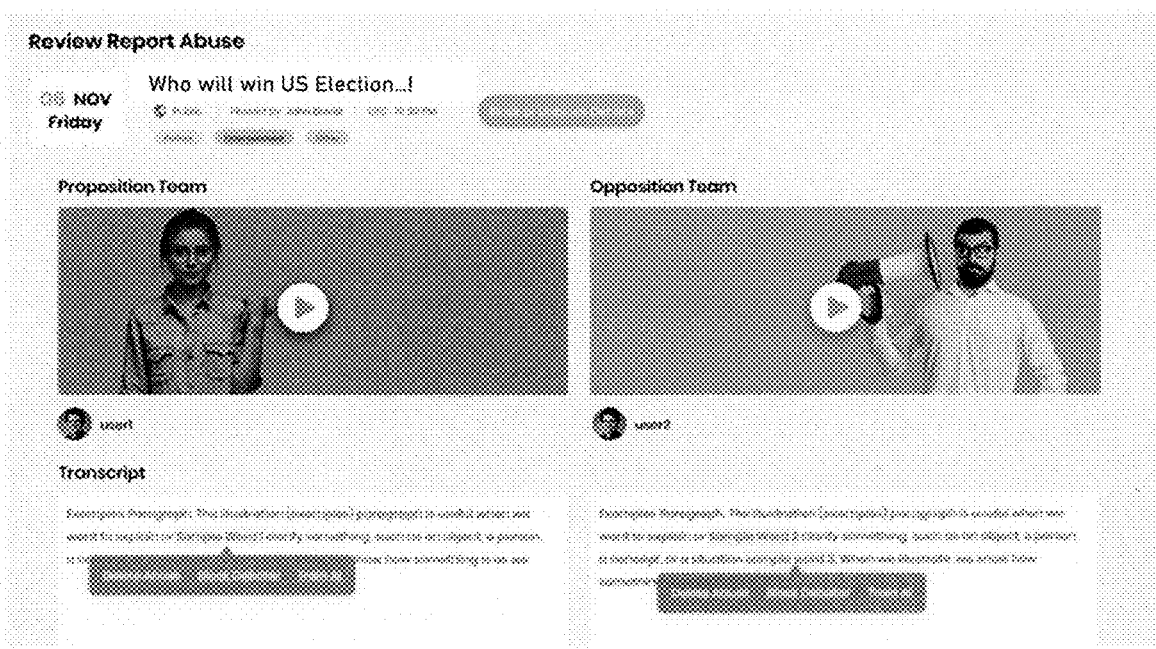
Fig. 20 – Flagged abuse example: website (internal view)
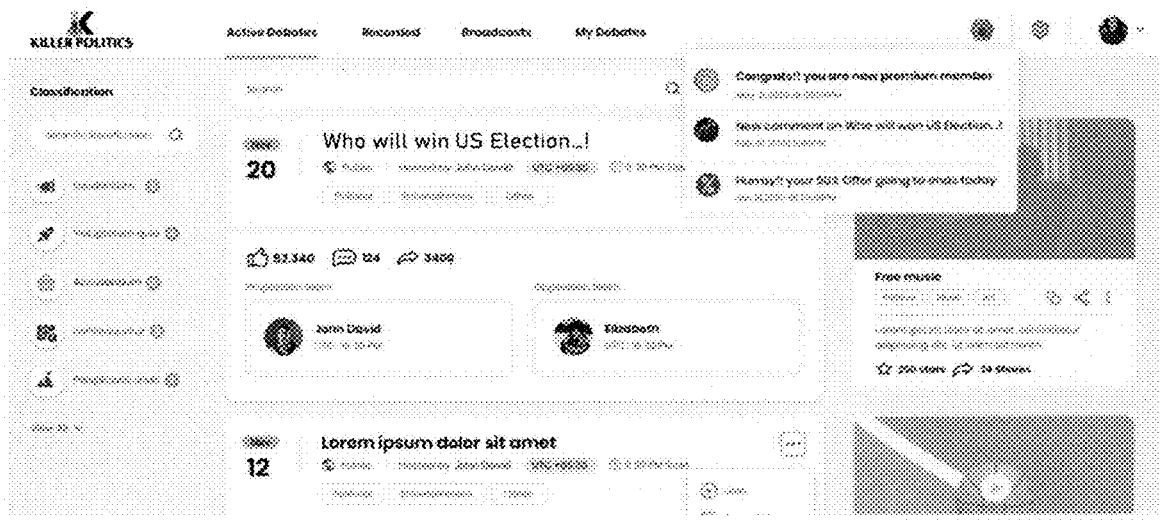
Fig. 21 – Notification example: website

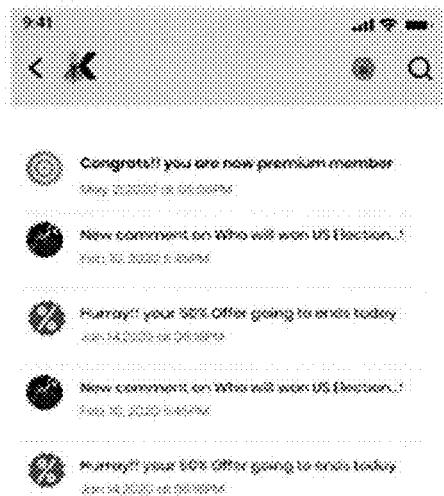
Fig. 22 – Notification example: mobile
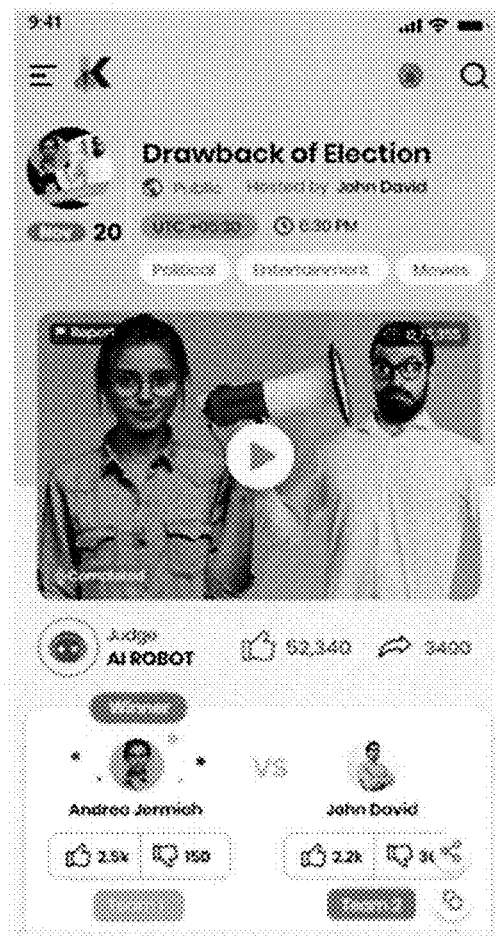
Fig. 23 – Post-debate winner indicator

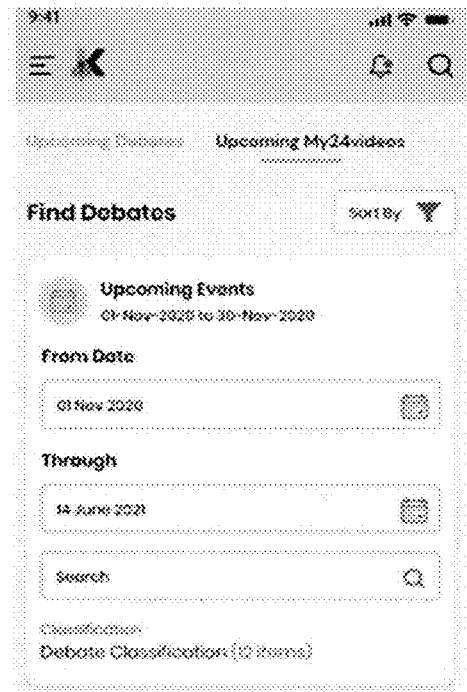
Fig. 24 – Event/Debate search for current & future events: mobile
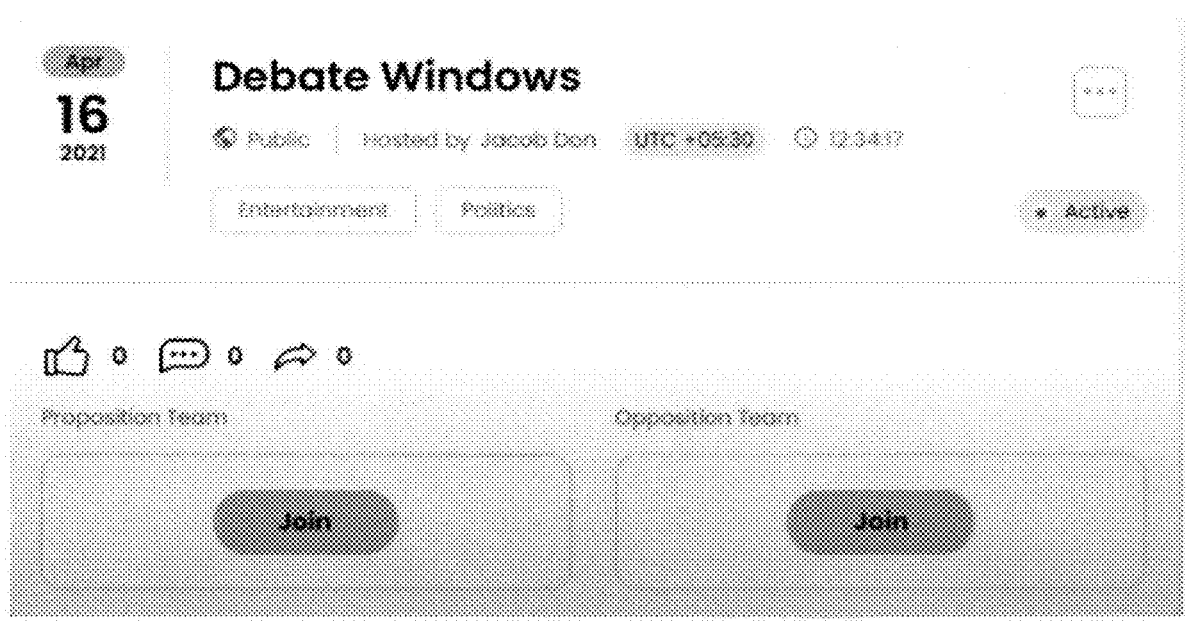
Fig. 25 – Instant debate entry example: website

Fig. 26 – Instant debate entry example: mobile

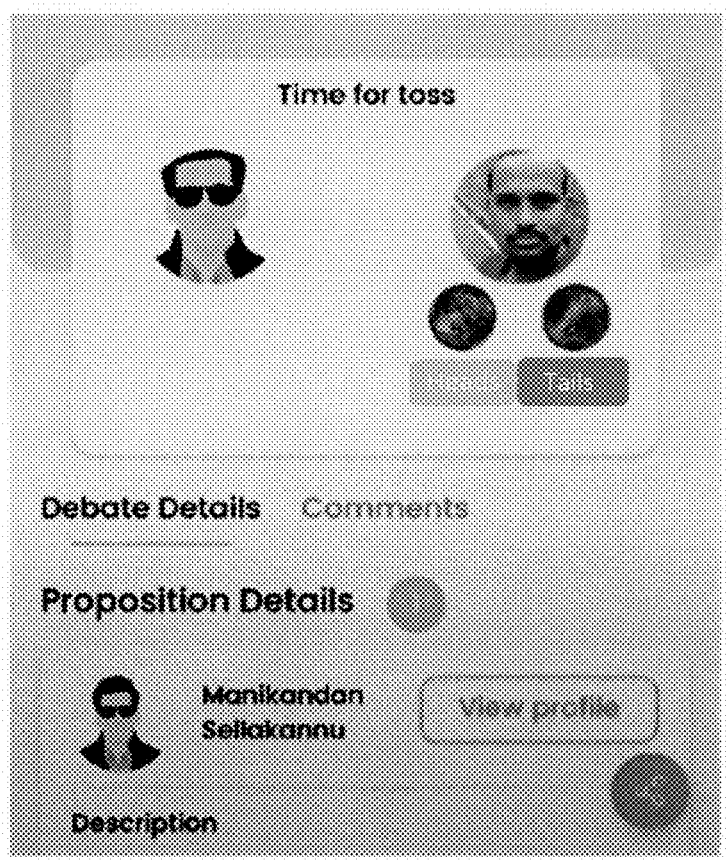
Fig. 27 – Coin-flip selection example: mobile
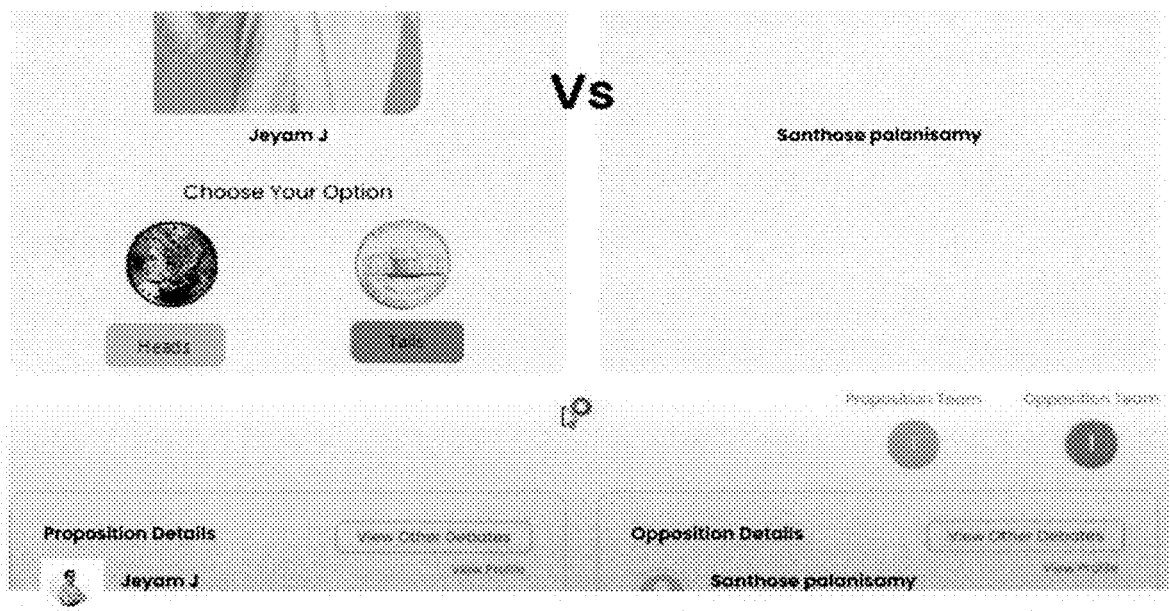
Fig. 28 – Coin-Flip selection example: website

ONLINE DEBATE PLATFORM AND METHOD

FIELD OF THE INVENTION

The present invention relates generally to the field of online debate platforms. More specifically, the present invention is concerned with a system and method for facilitating and monitoring online debates using artificial intelligence ("AI").

BACKGROUND

The issue and problem we intend to solve through the means of our technology is the current plight of social media platforms today: where users talk at each other versus with each other.

On social media platforms today, the premise of debating your opinions and viewpoints is commonplace. However, it is also a known quality of current social media platforms that draws considerable amounts of judgment and frustration. Having taken note of the issue that plagues the popular social media platforms, this application is attempting to remedy this by giving users a safe, secure and designated outlet for those in need of debating every point of view.

As will be referenced in this document; the diagrams and descriptions of the functionality of the application will highlight the novel aspect of the online debate platform. The online debate platform will provide wide-ranging services to users all around the world. This will be the first social media platform that combines elements of news and on-demand video debates that will be governed by an artificial intelligence ("AI") monitoring system. This will also be the first social media platform where the "judgment" of the public will be encouraged to cultivate further discussions, debate topics and entertainment.

In general, the current consensus of social media platforms today is that they no longer serve as a place to bring people together. All current platforms are plagued with "cancel culture" and rampant bullying protected by little to no guardrails. In practice, the success of the online platform will be placed on the shoulders of our unique technology and strict user-agreed upon rules which governs a civil environment.

Each user, once paired with an opponent, will be given 60 seconds to present their arguments for the audience. The AI judge will select which user will speak first from an electronic "coin flip"; subsequently, the user who is not selected to speak first will get to speak last for closing remarks as a way to keep the debates balanced and impartial. Once the debate has concluded, the AI judge will instantly tabulate the viewers votes on the "winning" argument. Public debate(s) winners have the potential to change over the course of time based upon future viewings/voting. All video debates, public and private, will be available to view on demand 24/7.

This novel platform can be utilized in different mediums such as: smart phones, tablets, laptops, and smart TV's.

The online debate platform, as previously stated, provides various services outside of head-to-head video debates. As such, it will provide daily video news alerts and a formatted weekly show. The user will be notified (unless they opt-out and/or select only specific topics) multiple times a day of current 40-second news blasts. A weekly 30-minute video news content available to the user(s) will be a hosted panel discussing wide-ranging trending topics from all over the world. In addition to the video debates, the video news blast(s) and online show will be viewable on electronic devices.

This platform provides multiple options for participation that it will be accessible across all major electronic devices including smartphones, tablets, laptops, etc. This will allow users from every walk of life an opportunity to utilize the platforms many debate videos, newscasts, and other video content. Video camera compatibility is only required to utilize the platform if the platform user desires to participate in active/future video debate(s). Otherwise, a user can utilize the platform as a source of entertainment/content, news briefings, etc. With a single click, a user can view daily news blasts, watch current/previous episodes of an online show, watch current/previous public debates, comment/vote on public debates, and actively participate in active/pending debates as one of the participants.

Through the platform's strict set of guidelines, the users will know with confidence, that their viewpoints will be respected just not always agreed with.

SUMMARY

The present online debate platform is designed to give a platform for people of all beliefs, walks of life and point of views to have a common place to debate a range of topics. With the troubles of today, having a place for people to gather, debate, learn and grow is greatly needed.

Within the controlled setting created and curated by a support team, and the strict set of guidelines agreed to upon by each user, we are hoping to create a place of honest debate and growth of ideas. For example, as set by the guidelines, obscene language will not be permissible on the platform such as language that is derogatory or hateful. As show below, the present online debate platform's novel AI monitoring system can detect and correct those instances in real time.

By creating a safe/secure place for different minds to debate their point of view, the online debate platform application will be filling the void of current social media platforms that currently do not provide a secure/organized space to do so.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 1 illustrates the data flow from the account via the dashboard of the application.

FIG. 2 illustrates the data flow of the live streaming and VoD Broadcast.

FIG. 3 illustrates the data flow for the viewer interaction on the live/previously recorded debates/videos.

FIG. 4 illustrates how the user can create a future debate and/or instant debate for a topic they want to discuss that is not otherwise available.

FIG. 5 illustrates how the AI system within the online debate platform will flag obscene language and notify the user and the admins.

FIG. 6 illustrates the flow of each debate and how the coin toss feature is utilized within the platform.

FIG. 7 illustrates the viewpoint of the dashboard for the user via their mobile device.

FIG. 8 illustrates the viewpoint of the dashboard for the user via the website.

FIG. 9 illustrates the specifics on how the user can create a debate for a future and/or instant debate on the website.

FIG. 10 illustrates the specifics on how the user can create a debate for a future and/or instant debate on the mobile device.

FIG. 11 illustrates a specific example of how a future scheduled and/or featured debate will be viewed by the users on the website.

FIG. 12 illustrates a specific example of how a future scheduled and/or featured debate will be viewed by the users on the mobile device.

FIG. 13 illustrates a specific example on how the debates can be viewed by the users and the layout of the debate descriptions/comments/voting on the website.

FIG. 14 illustrates a specific example on how the debates can be viewed by the users and the layout of the debate descriptions/comments/voting on the mobile device.

FIG. 15 illustrates the publicly viewable profile of each user.

FIG. 16 illustrates how a user can create an instant debate to enter a community pool for debating other users who opt-in at random on the website.

FIG. 17 illustrates how a user can create an instant debate to enter a community pool for debating other users who opt-in at random on the mobile device.

FIG. 18 illustrates the appearance of instant debate notifications and a glimpse of participation FIG. 19 illustrates the appearance of the instant debate on the users' profiles and how a user can "opt-in" to enter the pool for a debate.

FIG. 20 illustrates the internal abuse as it is flagged in the system to be addressed by the user and the online debate platform support teams.

FIG. 21 illustrates the notifications on the platform on the website.

FIG. 22 illustrates the notifications on the platform on the mobile device.

FIG. 23 illustrates the post-debate winner indicator on the mobile device.

FIG. 24 illustrates the event/debate search for current and future event/debate(s) on the mobile device.

FIG. 25 illustrates the instant debate entry example on the website.

FIG. 26 illustrates the instant debate entry example on the mobile device.

FIG. 27 illustrates the coin-flip selection example on the mobile device.

FIG. 28 illustrates the coin-flip selection example on the website.

DETAILED DESCRIPTION AND PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Social media platforms have been around since 2003, with Myspace being the first dominant player. Since then, whether it is Facebook, Twitter, Instagram, or other platforms, what remains the same and familiar, is the ability to post thoughts and ideas, as well as other media publicly or share privately with friends. By posting on those platforms, the user can engage into discussions with other users. Unfortunately, those platforms are not designed to engage in civil debates and do not monitor hostile comments or obscene language unless flagged by a user. People with differing opinions talk at each other rather than talk with one another. Thus, the current social media platforms have not created a respectful and civil environment where both or all sides can be heard through technology and innovation. The present online debate platform sets out to deploy its unique AI on its platform, where it can effectively monitor obscene lingual and abusive words at people who are debating on the platform.

The specific improvement the present online debate platform has made in this novel next generation social media platform was the implementation of an artificial intelligence ("AI") monitor to its platform. In the past, social media platforms (e.g., Twitter, Facebook, and Instagram) allowed users to debate via text postings; The online debate platform allows its users to debate others via split screen video. While debating in real time video, two opponents will be monitored by the AI system in real time to check for abusive language. The AI system integrated in the online debate platform does not need to wait for a user to flag abuses on its platform. The AI system learns and adapts to what is acceptable language in live debates and what is not permissible abusive language. Once flagged by the AI system, users are notified with warnings, and depending on how severe, after internal review, can be banned from the online debate platform. One of the many features available to the users of the online debate platform includes an option to instantly debate active users on the platform. As such, if a user wants to debate another user in real time, that user can either join or create an instant debate topic to be open for registration by another active user who is of the opposite stance (proposition vs. opposition). The AI system is equipped to instantly match the user with another active user if they opt-in/join the current instant debate available.

Current social media platforms allow toxic and abusive comments not conducive to a civil debate, where the public at large has no way of declaring a winner in conjunction with tabulated votes. There is no clear flow of debate and users on the currently popular social media platforms will often find themselves inundated with comments/arguments from all sides without the opportunity to continue the dialogue before it gets out of hand.

The online debate platform has an AI system that controls the active debate user participation by providing a coin-flip to see who goes first in a debate. The AI system will also monitor the time slot of who is speaking and mute the microphone of the user who is waiting in turn, so every voice is heard in the debate. Each user will also be alerted when their allotted time is almost up or if their turn to speak is about to start.

Once the public votes, the "winner" is displayed instantly. By allowing the users/audience to see the "winner" instantaneously (FIG. 23), this will not only promote but also encourage concise and well thought through arguments by each participant to achieve that sense of "instant" gratification. By encouraging well-articulated arguments within the time limit set by the platform, this would promote the potential of maintaining the "win" as viewer traffic increases on the publicly viewable debates as users debate more frequently.

Regulating the time allotments for each debate and actively monitoring for abusive content, the present online debate platform aims to provide a social media experience for individuals who want to express their viewpoints and be heard without interruption. Registration/Initial Participation When a user registers with the platform, they will be able to fill out their profile with information that is checked for legitimacy through the online debate platform. As a built-in check for legitimacy, the information provided by each user is required to be established and accurate as described in more detail below. The present online debate platform with the assistance of the functioning AI capability along with the online debate platform support team will regularly monitor and check each user profile after initial registration. The users of the platform, upon initial registration, will have the option to sync/upload their information via other social media platforms. This will apply to such social media platforms as: Facebook, LinkedIn and Google. Potential users will be notified via email if their initial registration does not pass the user guidelines as set by the online debate platform before they have access to the full platform. Usernames on the online debate platform are to be kept near the user's real identification. For example, acceptable variation of a username for a user named "John Smith" could be as follows: J. Smith, John.S, John. Smith, John Smith, J.Smith90 and etc. The profile pictures uploaded are to be of the user only to maintain user authenticity. No filters, group pictures or cartoon "filler" will be permitted as a profile picture for each user. If the user does not have an acceptable profile picture readily available, they will have the opportunity to register natively on the online debate platform and take a profile picture via the profile picture upload image on the platform.

The authentication process is nearly instantaneous assuming the initial guidelines are met (i.e., a real photo, name, and confirmed email). Upon such authentication, the end user will receive a notification that their profile is now "live" on the online debate platform. If, upon registration and later review by the platform support team a violation is found—the user will have a temporary suspension on their profile until the violation is corrected and approved by the platform support team. If future violations are found by the platform support team, the user will be immediately notified. The user profile will remain in suspension from the online debate platform until the violation is corrected and approved. (FIG. 15) This is to establish a precedent of accountability by each user. After approval, they will be able to (i) participate in debates, watch debates, comment on debates, and share debates; (ii) watch the online debate platform video news blasts, comment on the online debate platform video news blasts, and share the online debate platform video news blasts; and (iii) watch the online show, comment on the online show, and share the online show.
Profiles/Instant Messaging/Friend Requests Once a user profile has been created and approved, their profile will become public, and they will have full access to the online debate platform. A platform user will have the option to publicly display their email address and phone number, as well as a selection of debate metrics. The following metrics are always viewable to the public: My Debates, Debates Won, Debate Hours (broken into increments), Debate Views, Debate Votes, and Debate Likes. Private profiles are not permitted on the online debate platform; only certain metrics and information will be optional for public viewing. (FIG. 15)

The user can also customize their profile for specific topics, video news blasts and like content. (FIG. 18, FIG. 21, & FIG. 22)

On the platform, users will also have the option of instant messaging other users to continue discussions, establish new networking opportunities, and potentially establish debating partner(s) for future topics.

Users of the online debate platform can befriend other members on the platform by "stinging" them. The "stung" user will have the option to accept the friend request or to reject the friend request per their discretion. If a platform user opts to unfriend another user on the platform, they can locate the user(s) on their friends list and "unsting" them to remove them from their friends list.
Video Debates: Options—Scheduled/Instant/Curated
Option 1: Scheduled Debate On the online debate platform, a user has the option to schedule a future debate with a predetermined topic with another user for public, private, or limited viewership. (FIG. 4) The user will also have the option to register to participate in a curated debate(s). The platform user will have the option to invite specific users to participate or to be notified when the curated debate topic goes "live" for participation. Once they are notified of the "live" curated debate, they can also schedule a debate with another user at this time.

A platform user can schedule a debate with another user as desired by creating their own debate topic if one does not exist per their preference.

If a user opts to create a debate, the user will be directed to the debate creation page to fill out the various metrics and their opted position of proposition/opposition (FIGS. 9 & 10). These figures illustrate how the user can fill out the debate information, select their position and either invite a specific friend/user or place it in the pool for any user to opt in on the preselected date.

If a user of the online debate platform does not want to actively participate in the debate, a user can either watch/comment/vote on live debates taking place on their newsfeed or they can view previously recorded debates in the various categories of their choosing to watch/comment/vote. (FIG. 13 & FIG. 14)
Option 2: Instant Debate Similar to the debate creation page (FIG. 9 &10), a user can create a debate to be "instantly generated" and available to active users.

Once the instant debate topic is live, users can select their position on the debate topic and enter the "pool" of debaters to be randomly paired with a user of the opposing viewpoint as generated by the online debate platform AI system. Though the "pool" is the collection of debaters that are currently live on the online debate platform; when referenced specifically within the instant debate, the "pool" is the term for the users who have selected the same position for the instant debate who will then be paired with the opposing point of view "pool". This guarantees the user will not be unintentionally paired with a user of the same viewpoint.

New instant debates will provide users with a notification similar to NewsBlasts, the online shown, online debate platform curated debates and other promotional notifications (FIG. 18). To participate in an instant debate, a user has four courses of action available to them. The user can then either click on the push-notification alert/email (FIG. 18), select to join in either the proposition/opposition section on a trending instant debate on their newsfeed (FIG. 19), or search via the instant debate section under the Active Debate tab. If an instant debate is not already created for debaters to enter either proposition/opposition debate pool for random pairing the user can create an instant debate (FIGS. 16 & 17) to be live for the platform users to participate.

There is a fifth instant debate option that is available to the platform users via the online debate platform curated debate. Once a curated debate is "live" on the platform, a user can either invite another user to participate (if a debate was not scheduled in advance) or they can register in the debate for their specific stance much like an instant debate to be randomly paired with an online user in the opposing point-of-view.

Random pairing of an opposing point of view for a curated debate will only be generated once the platform user selects "join" for the debate (FIG. 25 & FIG. 26). If they have not already selected a stance, in which their information would be automatically generated, they will have the option to do so much like an instant debate as illustrated above.

If a user of the online debate platform does not want to actively participate in the debate, a user can either watch/comment/vote on live debates taking place on their newsfeed or they can view previously recorded debates in the various categories of their choosing to watch/comment/vote. (FIG. 13 & FIG. 14)

Option 3: Curated Debate

The online debate platform team will curate topics for debate based on trending subjects, for example, celebrity breakups, sports figures, nominations, etc. Curated debates differ from the instant and scheduled debates in the sense that these debates are hot-topic issues that are known to take place well into the future. For example, political elections, upcoming award shows, etc. (FIG. 11 & FIG. 12)

The user will also have the option to register to participate in a curated debate. The platform user will have the option to invite specific users to participate or to be notified when the debate topic goes "live" for participation. Once the curated debate is "live" on the platform, a user can either invite another user to participate (if a debate was not scheduled in advance) or they can register in the debate for their specific stance much like an instant debate to be randomly paired with an online user in the opposing point-of-view.

If a user of the online debate platform does not want to actively participate in the debate, a user can either watch/comment/vote on live debates taking place on their newsfeed or they can view previously recorded debates in the various categories of their choosing to watch/comment/vote. (FIG. 13 & FIG. 14)

Coin Flip Functionality

The online debate platform AI system allows for each debate participant to see who goes first through a virtual coin-flip. This mechanism will allow for a fair and clear random determination of which platform active debater will start the debate and which platform active debater will close the debate when either randomly paired or challenged by another user through the platform. (FIG. 6, FIG. 27, & FIG. 28)

Online Show & News Blasts

The uniqueness of the online debate platform also infuses a weekly synopsis and acknowledgment of trending topics/debaters and breaking news in the form of a digital round table discussion. This digital production will be known to the users as the online show.

During the weekly digital broadcast of the online show, the panel of hosts will review trending topics, debates, debaters, and news from the current week. Viewers will have the means in which they can directly interact with the show hosts to promote deeper discussions and further acknowledgments of various topics. The participation of viewers to the online show hosts will be in the form of live commenting similar to how the live commenting is viewable to active debaters/debates on the online debate platform.

Beyond the online show, the platform will provide breaking news coverage alerts sent to users like the online show via push-notifications and email. These mini-digital news broadcasts, known as News Blasts, are "bite-sized" instant coverage of breaking news no longer than 40 seconds in length. (FIG. 2)

Users can opt to have email and/or push application notifications for the weekly show and news blasts as curated by the online debate platform. This can range from a generic alert/notification for all videos to personalized video topic selections for specific categories & trends.

AI Monitoring System

The AI system's unique aspect will be its internal monitoring algorithm which will provide both the online debate platform team and platform user(s) with an instant alert if an offense is "flagged" (FIG. 20). It offers real-time observation and alerts to both the user(s) and the online debate platform team to monitor and adjust accordingly (FIG. 5). This real-time observation includes monitoring the live debates (audio) and commenting (text). As offenses are flagged to the user and to the online debate platform team. The support team can either "teach" the AI if the flag is in error to remedy that issue, or, it can affirm its flag to be more responsive for future monitoring (FIG. 20). This feature intends to encourage users to stick to the debates and subject matter rather than resorting to personal attacks in real time. The AI's advanced feature will allow the system to "pin-point" the offensive word/words out of an entire sentence within context and subsequently alert both the user and the online debate platform team. The notification to the user and the online debate platform team will provide further context as to why this word/sentence was flagged (FIG. 5). The user will have the opportunity via the alert to "contest" the flag if warranted. If the flag/alert is determined in error by the support team prior to a contention by the user (or after reviewing the "contest"), the support team can correct the AI and subsequently notify the user of the correction.

Other functions of the AI monitoring system are as follows:

- The AI system controls the "coin-flip" for who goes first in the debates.
- The AI system controls the microphone of who is actively speaking versus who is not actively speaking.
- The AI system monitors the voting during and post debates to continually affirm and/or change the "winner" based upon viewer participation.
- The AI system curates the viewable debate topics based on the user profile/viewing trends.
- The AI system randomly generates the debate opponent per each platform user when participating in an open/instant debate.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A debate facilitation and monitoring system comprising:
    an artificial intelligence ("AI") monitor;
    a user interface which allows input of debate parameters including at least two opponents, a position for each opponent, and a time limit;
    a display screen for displaying a video feed of a debate between the opponents;
    wherein the AI monitor identifies abusive language;
    wherein the AI monitor implements monitoring of audio and text comments of the opponents and a viewing audience in real time and flags any instances of abusive language in real time;
    wherein the AI monitor implements banning of users in response to one or more instances of abusive language;
    wherein the AI monitor sends real time notifications relating to flagged language to each of said at least two opponents and to a support team;
    wherein the AI monitor identifies offensive words out of one or more sentences and said notifications provide context for why language was flagged; and
    wherein the AI monitor monitors audience voting in real time and after the debate concluding after a predetermined allotted time and updates a declared winner of the debate as audience votes are continually tabulated.

* * * * *